United States Patent [19]

Ohya et al.

[11] 3,939,027

[45] Feb. 17, 1976

[54] METHOD OF BONDING FLUORO PLASTICS TO A BASE

[75] Inventors: Shogo Ohya, Kyoto; Momoyoshi Takagi, Yahatacho; Masao Kurokawa, Tokyo, all of Japan

[73] Assignee: Masao Kurokawa, Japan

[22] Filed: Aug. 6, 1974

[21] Appl. No.: 495,541

[52] U.S. Cl. .................................. 156/306; 156/322
[51] Int. Cl.² ............................................ C09J 5/06
[58] Field of Search ........... 156/306, 309, 322, 324, 156/498

[56] References Cited
UNITED STATES PATENTS

| | | | |
|---|---|---|---|
| 3,318,029 | 5/1967 | Jacobson | 156/253 |
| 3,826,704 | 7/1974 | Ohya et al. | 156/306 |

*Primary Examiner*—Douglas J. Drummond
*Assistant Examiner*—Brian J. Leitten
*Attorney, Agent, or Firm*—Wenderoth, Lind & Ponack

[57] ABSTRACT

A method of bonding a fluoro plastic to a substance to be covered therewith. The fluoro plastic is heated along with the substance to be covered to a temperature above the melting point of the fluoro plastic, and then the substance and the fluoro plastic in the melted state are brought into contact and kept at the temperature for a time sufficient to wet the boundary surface between the fluoro plastic and the substance. The boundary surface is then gradually cooled from the melting point to a further temperature at which the rate of crystallization of the fluoro plastic is maximized. Thereafter the substance is cooled to room temperature. The process prevents the internal stress caused in the fluoro plastic from being concentrated at the boundary surface.

3 Claims, 3 Drawing Figures

METHOD OF BONDING FLUORO PLASTICS TO A BASE

This invention relates to a method of bonding fluoro plastics tightly to a base or substrate of metal or any other substance.

The bonding strength in terms of tensile shear strength realized by the present invention is not less than 150 kg/cm² with respect to tetra fluoro ethylene - hexa fluoro propylene copolymer (FEP), and not less than 240 kg/cm² with respect to polychloro trifluoro ethylene (PCTFE) or polyvinylidene fluoride (PVdF).

In the bonding method of this invention, the fluoro plastic being bonded to a substrate must have a satisfactory degree of liquidity when it is heated beyond its melting point. Tetra fluoro ethylene plastic, which does not meet this condition, is therefore necessarily omitted from the materials with which the method is useful.

Therefore, in the following description, by fluoro plastics is meant only those that show ample liquidity when heated, i.e. tetra fluoro ethylene - hexa fluoro propylene copolymer (FEP), polychloro trifluro ethylene (PCTFE), and polyvinylidene fluoride (PVDF).

In recent years the rapid growth of the engineering, electrical, chemical, and other such industries, followed by an equally rapid development in the ocean and space programs, has resulted in the need for numerous types of compound materials consisting of plastics and metals, ceramics, and other substances possessing superior electrical qualities, chemical resistance, weather resistance and the like.

Fluoro plastics are by far the best of all plastics in use today in that they possess the most superior electrical qualities, chemical resistance, and surface characteristics. Furthermore, among these plastics, PTFE has in addition to the superior characteristics listed above, the characteristic that it is extremely heat resistant.

Thus we can see that fluoro plastics possess many excellent properties as indicated above and their range of usage may be termed as indefinitely wide. On the other hand they possess a flaw in that they have heretofore been thought to have weak bonding properties, although at least in this context it does not mean bonding strength in the strict sense.

Various methods have been explored so far in an attempt to compensate for this serious flaw. For example one method used in the production of laminated products is a simple adhesion method, i.e. heating the fluoro plastic alone, or along with the other substance to which it is to be bonded, beyond its melting point and then bringing them together. This method may be used to a certain extent, but in most cases the result is nothing more than a seemingly effective outward appearance of an actually ineffective bond, and it meets none of the conditions of so called "bonding" in the limited sense as defined above.

This weakness with respect to adhesion properties characteristic of fluoro plastics and polyolefine has become a generally accepted fact. In the case of polyolefine, the basic idea underlying this belief is the WBL, or "weak boundary layer" theory, which is as follows.

A "weak boundary layer" develops near the bonding surface of the polyolefine resulting in the destruction of the bond. In order to avoid the formation of this WBL, a crosslinking method has been developed where impurities, which cause the formation of such a layer, are prevented from gathering together at the surface of the polyethylene by treating it with inert gas so as to activate it for promoting crosslinking, i.e. the so called CASING Method. Another method commonly used is the transcrystal method in which crystallization is controlled during the process of preparation of the polyethylene film. Polyolefine, particularly crystalline polyethylene, can thus be bonded firmly (tensile shear of about 2,000 to 3,000 Psi) by the use of such method.

However, when strong bonding is required between polyolefine and a substance to be covered therewith for practical or industrial usage, the surface of polyolefine must be previously treated with a corona discharge, flame, a liquid mixture of bichromate and sulfuric acid, or electron beam radiation so as to improve the bonding strength, and in addition epoxy resin or gum adhesive must be applied thereto.

However, such a bonding method has disadvantages in that the bonding technique is complicated by such surface treatments of polyethylene and the like required before bonding, the properties of the polyethylene deteriorate as a result, and coating such an adhesive evenly on the surface of any substance is difficult, depending on its shape or size.

Therefore, a method of bonding has heretofore been proposed which results in values of 320 kg/cm² for tensile shear strength of bonding of high density polyolefine and iron. This method involves heating the polyolefine above the melting temperature on the substrate, and then controlling the cooling.

The difficulties discussed above concerning polyolefine also occur with the fluoro plastics. Actually, this bonding method which will now be discussed was developed mainly for polyolefine. It was later that tests with other plastics showed that the process could also be applied to fluoro plastics. However, there are further problems with the fluoro plastics.

First of all, PTFE, which has previously been described as a substance possessing superior electrical qualities, chemical resistance, surface characteristics, as well as extreme resistance to heat, also possesses on the other hand, a weakness with respect to molding processes and therefore the general method used for thermoplastics cannot be used therefor. Therefore, in coating and lining processes, the dispersion method is used. However, the membranous PTFE layer obtained by such a method often contains pinholes. In order to avoid the formation of such pinholes, the coating or glazing must be repeated a number of times, the final result being a rather thick, and thus an impractical coating.

A method widely used in bonding PTFE to metal plates is one in which the non-adhesive membrane of PTFE plastic is brought together with the metal surface for a certain amount of time, while the temperature is maintained at least at 330°C. Even in this process, however, it is not a simple task to prevent the formation of pinholes.

Tetra fluoro ethylene - hexa fluoro propylene copolymer is less resistant to heat as compared to PTFE, but responds readily to molding processes. Therefore, in bonding copolymer to metal plates, the surface of the fluoro plastic is treated with an alkali metal to strengthen its adhesive properties and then an adhesive of epoxy plastic is applied. Since this process involves the application of an adhesive, the user is again faced with the problem of an even coating, especially on materials with large surface areas or on the inside surface of tubular objects.

However, we have come up with a way to solve all the above-mentioned difficulties at once. In other words, we have devised a method in which the previously defined "bond" may be obtained without any prior treatments or the use of adhesives. That is to say, we have devised a process in which fluoro plastics, previously thought of as possessing extremely poor adhesive qualities, can be transformed into a most powerful adhesive.

The method according to the invention comprises heating the fluoro plastic and the substance to a temperature above the melting point of the fluoro plastic and below the point at which the fluoro plastic will be denatured, bringing the substance and the fluoro plastic in the melted state into contact and keeping them at said temperature for a time sufficient to wet the boundary surface between the fluoro plastic and the substance, cooling said boundary surface from the contact temperature to a temperature range between a further temperature $T_m$ and $T_m + 50°C$., the temperature $T_m$ being the temperature at which the rate of crystallization of the fluoro plastic is maximized and is given by the formula [(melting point (°C)+273)×9/10]-273, and either holding the adhered substance and fluoroplastic in said range for at least 5 minutes or cooling it through the range at a cooling rate no faster than 5°C/min., and thereafter cooling the substance and the fluoro plastic to room temperature, whereby the internal stress caused in the fluoro plastic is prevented from being concentrated at the boundary surface.

The invention will now be described further in the following specification, taken with the accompanying drawings, in which.

Figure 1:
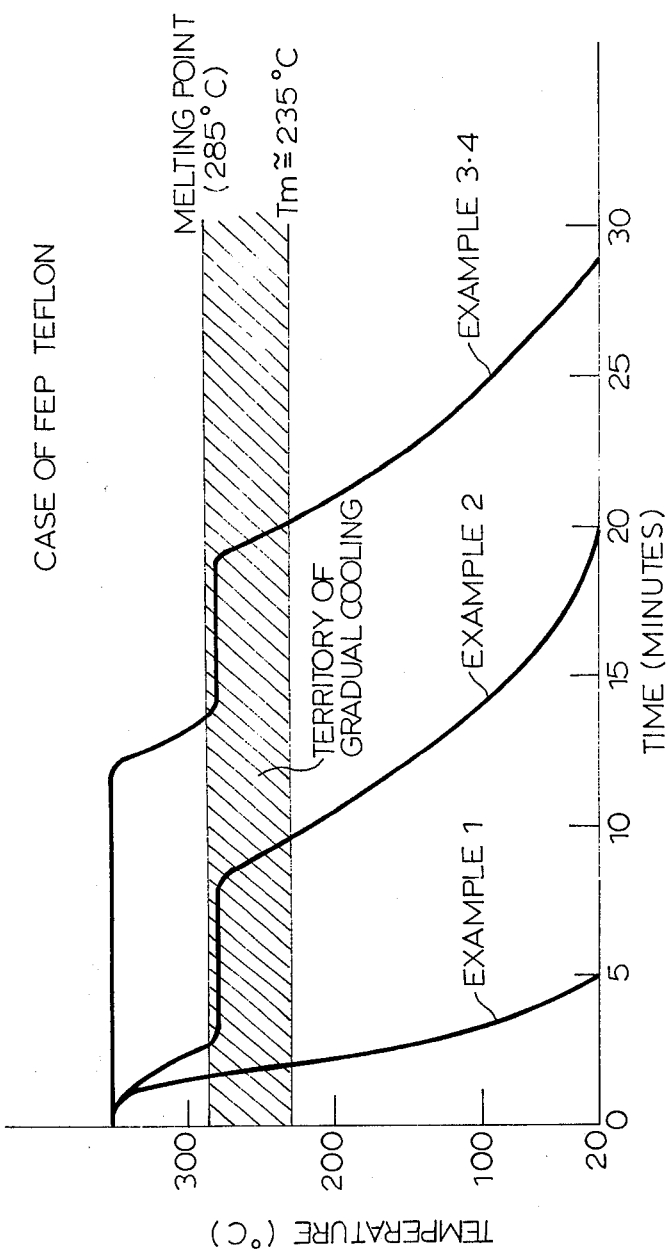
FIG. 1 is a graph of the temperature verses the time for cooling for FEP on a substrate.

From our analysis, we consider the following to be the reasons for the poor bonding characteristic of fluoro plastics. When fluoro plastics are cooled (or cooled quickly) after having been melted by heating and are bonded to a substance to be covered therewith, or when fluoro plastics are left to cool naturally after having been melted by heating to be bonded to a substance having a small thermal capacity, internal stress caused by cohesion forces, which may be produced within the bonded portion of the fluoro plastics during the cooling, is concentrated at the boundary surface of the bond. This makes the bonding characteristic of the fluoro plastics poor.

This is thus related not to the processes of heating the fluoro plastic above the melting point and bringing it into contact with a substance to be covered therewith and keeping them in contact for a certain fixed time, but rather to the cooling process.

The internal stress caused by cohesion forces produced within the bonded portion of the fluoro plastics and the concentration of this stress at the boundary surface of the bond is related to the temperature at which the rate of crystallization of the fluoro plastics becomes a maximum. Therefore, according to the present invention, what must be done is to cool the fluoro plastic and substance gradually from its melting point down to the above-identified temperature at which crystallization takes place at the maximum rate, which shall be termed $Tm$. This $Tm$ differs for each polymer, but it can be set down in the general equation (melting point °C + 273) × 9/10. And thus, using this equation the temperature range of gradual cooling may be determined for each polymer.

The method which we have developed can be described as follows from the above analysis. The substance which is to constitute the substrate and a fluoro plastic are heated to a temperature above the melting point and to which the plastic liquifies, and while maintaining contact between the melted plastic and the substrate, and then the whole unit is gradually cooled past the melting point to the temperature $Tm$ at which the maximum rate of crystallization takes place. Thereby the concentration of the internal stress at the boundary surface during bonding, which normally occurs in the cooling process, is prevented.

In more detail, the temperature to which the substance and the fluoroplastic are heated while they are together is a temperature in the range between the melting point of fluoro plastic and the melting point plus 100°C. The above temperature is kept constant for at least five minutes, which is the period of time necessary for creating bonding strength in the boundary surface. Concentration of internal stress in the boundary surface during bonding, which stress is normally produced in the fluoro plastics in the process of cooling the boundary surface, is avoided by the gradual cooling. The gradual cooling can be accomplished in either of two ways, either by keeping the fluoro plastic and the substance for at least five minutes in a temperature range from the temperature $Tm$ where the growth rate of crystallization is maximized to the temperature $Tm$ plus 50°C, or by cooling it gradually through the same temperature range at a cooling rate no faster than 5°C/min.

In accordance with the method of this invention, one may obtain any desired degree of adhesion by controlling the melting-adhesion temperature, the time for which it is maintained and the gradual cooling time. However, the conditions must be such that the fluoro plastics being used must exhibit an ample degree of liquidity when heated beyond their melting point. This condition does somewhat limit the sphere of usage, but nonetheless, as long as this single condition is met, the process can be used with any of the fluoro plastics as defined above.

While it was thought that tetra fluoro ethylene-hexa fluoro propylene copolymer (PCTFE) possessed many superior qualities except that of adhesion, it has now been proven, as will be described later in the examples, to possess a strong bonding power when applied according to the new process. It can safely be said that this copolymer now possesses all the superior qualities, including that of adhesion, and its usage should become much wider than heretofore.

In its bonding to substances to be covered therewith, since there is no necessity to deal with any sort of adhesive material, large surface areas and cylindrical surfaces present no problems. Furthermore, an internal lining can be easily formed in tubular articles by fitting a fluoro plastic tube within the tubular article to be lined, applying a small amount of pressure, then carrying out the melting-bonding process, and then gradually cooling the whole. The fluoro plastic may also be used as a strong adhesive between two substances and may be used in producing laminated products, lined cylinders, and the like.

It must be added here that since the process does not involve the use of adhesive material, it therefore does not call for prior treatments of fluoro plastic sheets or the like. This is a most important point concerning the usage of fluoro plastics.

It has already been stated that the melting-adhesive temperature, the melting-adhesive time (i.e. the time the melted fluoro plastic is maintained at the temperature above melting temperature and in contact with the substrate), and the gradual cooling time can be adjusted to produce the desired degree of adhesion. In other words, where the "wetting" caused by the relationship between the melting-adhesive temperature and time is ample, the adhesion can be controlled solely by the adjustment of the cooling time. This is an effect that was unobtainable from any adhesive up until now, prior to the development of the new process.

Furthermore, even when the fluoro plastic is remelted by the reheating of the boundary surface after its bonding to a substance in accordance with the process of this invention, the boundary surface can be firmly bonded again by gradual cooling under the previously described conditions. The high bonding strength between the fluoro plastic and the substrate can be utilized advantageously and effectively for secondary work such as bending, punching and cutting.

There will now be given a further explanation of the process through the use of examples. This invention is characterized by controlling the degree of adhesion by the corresponding selection of the gradual cooling time, made possible through the relationship between the melting-adhesive temperature and the melting-adhesive time and the "wetting" relationship. Therefore, the various temperatures and time units used in the examples in no way limit the technical range (scope) of this process. Since annealing, the maintenance of the fluoro plastic at a temperature above $T_m$ for a certain amount of time, is included in the gradual cooling process, the examples have followed suit.

Theoretically and technically it will be apparent that substances to be coated or adhered to each other by the method of the invention must be such as to substantially withstand temperature above the melting point of the fluoro plastics, and that the heating, even though it must reach a point somewhere above the melting point, cannot be a temperature at which the fluoro plastics themselves may be denatured.

EXAMPLE 1

Tetra fluoro ethylene-hexa fluoro propylene copolymer (here referred to as FEP, a product of DuPont Company FEP Teflon 100, melting point 285°C) was formed into a tube with a wall thickness of 1 mm using a melting extruding mechanism operating at 350°C. This was melt-bonded at 350°C to the outside of a polished and degreased steel pipe having a wall thickness of 4.2 mm in order to cover it, and cooled quickly, as shown in FIG. 1. The resulting adhesion of the FEP layer was weak, and it peeled off quite easily.

EXAMPLE 2

The FEP and steel pipe were treated in the same way as in Example 1, except for the cooling process. The melt-bonded pipe and tube were placed in an oven maintained at 280°C and annealed for five minutes before being cooled to ambient temperature, as shown in FIG. 1. On one severed end of the FEP covered tube, pressure was applied in an attempt to crush the FEP layer, but the FEP layer did not peel or break off.

EXAMPLE 3

Next the bonding strength with respect to shearing was measured. An FEP film having a thickness of 0.5 mm was formed on a regular melting-extruding (molding) machine. This film was sandwiched between two polished and degreased metal plates, each having a thickness of 3 mm. This was heated to 350°C and held for 12 minutes melting-adhesive time. The material used in the tests was formed by annealing the laminated assembly at 280°C for 5 minutes and then cooling it as shown in FIG. 1.

This material was put on an autograph tester (tensile speed 30 mm/min.). It had a tensile shear strength of 150 kg/cm$^2$ between the two metal plates. The separated plates showed under observation that the FEP was adhered firmly to both metal plates and no destruction had occurred at the bonding surfaces.

EXAMPLE 4

The process for Example 3 was repeated using a steel plate and an aluminum plate, each having a thickness of 3 mm. The steps taken were exactly the same as those of Example 3, and the result was again a tensile strength of 150 kg/cm$^2$.

EXAMPLE 5

Figure 2:
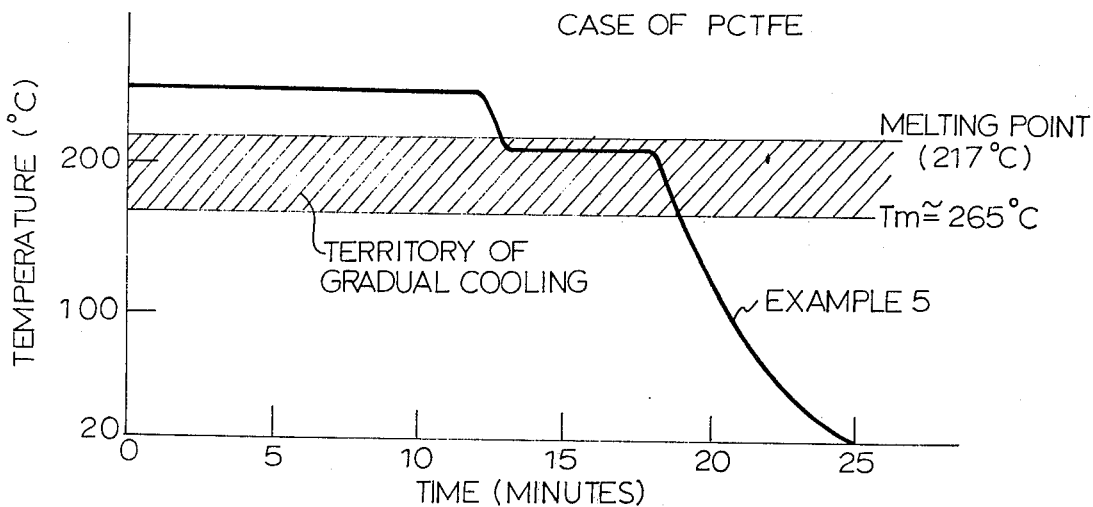
FIG. 2 is a graph similar to FIG. 1 for PCTFE.
Figure 3:
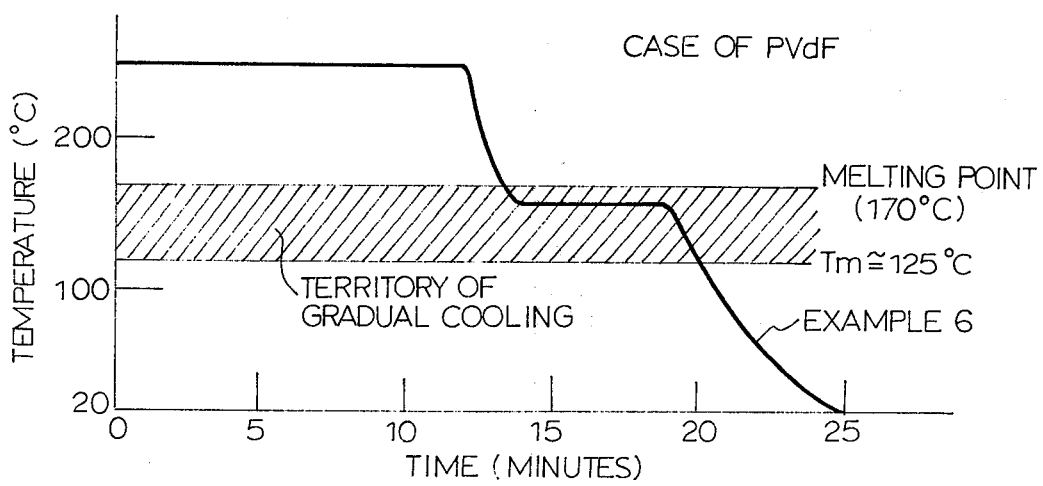
FIG. 3 is a graph similar to one for PVdF.

PCTFE(Daiflon M-300P-product of Daikin Co.) was used in place of FEP in Example 3. The process was the same, but this time with a melting-adhesive temperature of 250°C and an annealing temperature of 210°C, as shown in FIG. 2. The result was a tensile shear strength of 240 kg/cm$^2$.

EXAMPLE 6

Polyvinylidene (PVDF, Dulite product of DuPont Co.) was substituted for FEP in Example 3 with a melting-adhesive temperature of 250°C and an annealing temperature of 160°C. The result was a tensile shear strength of 240 kg/cm$^2$.

What is claimed is:

1. A method of bonding a fluoro plastic to a substance to be coated therewith comprising heating a fluoro plastic selected from the group consisting of tetrafluoroethylene-hexafluoropropylene copolymer, polychlorotrifluoroethylene and polyvinylidene fluoride and the substance to a temperature above the melting point of the fluoro plastic and below the point at which the fluoro plastic will be denatured, bringing the substance and the fluoro plastic in the melted state into contact and keeping them at said temperature for a time sufficient to wet the boundary surface between the fluoro plastic and the substance, cooling said boundary surface from the contact temperature to a temperature range between a temperature $T_m$ and $T_m +$ 50°C, the temperature $T_m$ being the temperature at which the rate of crystallization of the fluoro plastic is maximized and is given by the formula [(melting point (°C)+273)×9/10]−273, gradually cooling the boundary surface in said range for at least five minutes, and thereafter cooling the substance and the fluoro plastic to room temperature, whereby the internal stress caused in the fluoro plastic is prevented from being concentrated at the boundary surface.

2. A method of bonding a fluoro plastic to a substance as claimed in claim 1 wherein the step of gradually cooling the boundary surface in said range comprises holding the boundary surface at a temperature in said range for at least five minutes.

3. A method of bonding a fluoro plastic to a substance as claimed in claim 1 wherein the step of gradually cooling the boundary surface in said range comprises cooling it through said temperature range at a cooling rate no faster than 5°C/min.

* * * * *